United States Patent
Fujikawa

(10) Patent No.: US 9,471,100 B2
(45) Date of Patent: Oct. 18, 2016

(54) ELECTRONIC DEVICE

(71) Applicant: FUJITSU LIMITED, Kawasaki-shi (JP)

(72) Inventor: Hideyuki Fujikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 14/503,868

(22) Filed: Oct. 1, 2014

(65) Prior Publication Data

US 2015/0119117 A1   Apr. 30, 2015

(30) Foreign Application Priority Data

Oct. 24, 2013   (JP) .................................. 2013-221236

(51) Int. Cl.
*G06F 1/16* (2006.01)
*G09G 5/00* (2006.01)

(52) U.S. Cl.
CPC ........... *G06F 1/1626* (2013.01); *G06F 1/1601* (2013.01); *G06F 1/1633* (2013.01); *G06F 1/1637* (2013.01); *G06F 1/1679* (2013.01); *G06F 2200/1631* (2013.01)

(58) Field of Classification Search
CPC .. G06F 1/1601; G06F 1/1637; G06F 1/1631; G06F 1/1626; G06F 1/1633; G06F 1/1679
USPC ............ 361/679.21, 679.22, 679.26, 679.27, 361/679.29, 679.3, 679.24, 679.01–679.45, 361/679.55–679.59; 349/58–60; 345/169; 341/22

See application file for complete search history.

(56) References Cited

U.S. PATENT DOCUMENTS

| | | | | |
|---|---|---|---|---|
| 4,950,072 A * | 8/1990 | Honda | ................. | G03B 21/132 349/161 |
| 5,684,672 A * | 11/1997 | Karidis | ................. | G06F 1/1616 343/702 |
| 6,426,784 B1 * | 7/2002 | Sakai | ................. | G02F 1/133308 349/58 |
| 9,263,842 B2 * | 2/2016 | Filson | ................... | G06F 1/1601 |
| 2009/0167978 A1 * | 7/2009 | Goto | ..................... | G06F 1/1616 349/58 |
| 2010/0172081 A1 * | 7/2010 | Tian | ..................... | G06F 1/1632 361/679.29 |
| 2012/0326575 A1 * | 12/2012 | Hirota | ................... | G06F 1/1601 312/7.2 |
| 2013/0016459 A1 * | 1/2013 | Nonaka | .................... | H04N 5/64 361/679.01 |

FOREIGN PATENT DOCUMENTS

| | | |
|---|---|---|
| JP | 3-6874 U | 1/1991 |
| JP | 8-205269 A | 8/1996 |
| JP | 2009-14137 A | 1/2009 |

* cited by examiner

*Primary Examiner* — Nidhi Thaker
(74) *Attorney, Agent, or Firm* — Westerman, Hattori, Daniels & Adrian, LLP

(57) ABSTRACT

An electronic device includes a device body, a cover that is attached to the device body so as to face the device body, a contact portion that is formed with a side of the cover and is arranged at one end side in an orthogonal direction which is orthogonal to a direction in which the cover faces the device body, and a suppression portion that is formed with one end side in the orthogonal direction of the device body, suppresses release of the cover by contacting the contact portion when the cover is moved in a separation direction in which the one end side of the cover becomes separated from the device body, and allows release of the cover when the cover is rotated with the one end side as a supporting point so that the other end side in the orthogonal direction becomes separated from the device body.

12 Claims, 14 Drawing Sheets

ELECTRONIC DEVICE

CROSS-REFERENCE TO RELATED APPLICATION

This application is based upon and claims the benefit of priority of the prior Japanese Patent Application No. 2013-221236, filed on Oct. 24, 2013, the entire contents of which are incorporated herein by reference.

FIELD

The techniques disclosed herein are related to an electronic device.

BACKGROUND

Conventionally, there is a remote controller case that has a top case and a bottom case and in which a rib disposed on the bottom case suppresses a separation of a hook locking portion from a hook portion by restricting movement of the hook locking portion in the interior direction. These techniques are disclosed in, for example, Japanese Laid-open Patent Publication No. 8-205269.

SUMMARY

According to an aspect of the invention, an electronic device includes a device body, a cover that is attached to the device body so as to face the device body, a contact portion that is formed with the device body side of the cover and is arranged at one end side in an orthogonal direction which is orthogonal to a direction in which the cover faces the device body, and a suppression portion that is formed with one end side in the orthogonal direction of the device body, suppresses release of the cover by contacting the contact portion when the cover is moved in a separation direction in which the one end side of the cover becomes separated from the device body, and allows release of the cover when the cover is rotated with the one end side of the cover as a supporting point so that the other end side of the cover in the orthogonal direction becomes separated from the device body.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present disclosure provide an electronic device that makes it possible to define release directions of a cover with respect to a device body with a simple structure.

Embodiments of techniques disclosed herein will be described below.

First Embodiment

Electronic Device 10 According to a First Embodiment

Figure 1:
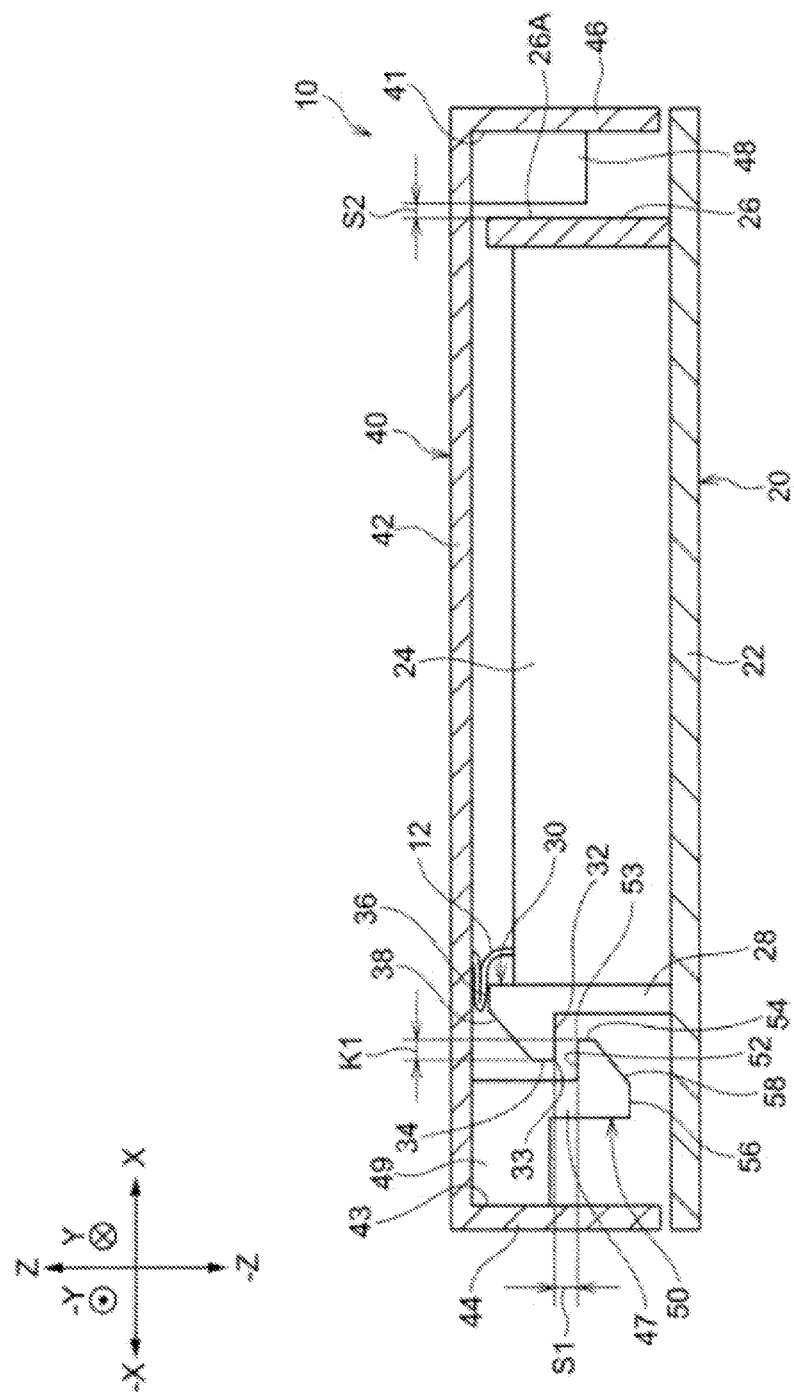
FIG. 1 is a sectional side view illustrating an electronic device according to a first embodiment.

First, an electronic device 10 according to a first embodiment will be described. FIG. 1 is a sectional side view illustrating the electronic device 10 according to the first embodiment. An X-direction, −X-direction, Y-direction, −Y-direction, Z-direction and −Z-direction, which will be described below, are arrow directions illustrated in the drawings.

The electronic device 10, as illustrated in FIG. 1, has a device body 20 and a cover 40, which is attached to the device body 20. Specifically, the cover 40 is attached to the device body 20 in a state in which the cover 40 faces the device body 20 in the −Z-direction (facing direction).

Moreover, as an example, the cover 40 is fixed to the device body 20 by fastening members (not illustrated) such as screws. In other words, the cover 40 may be released with respect to the device body 20 by removing the fastening members (not illustrated) such as screws. Furthermore, the cover 40 is configured to become separated from the device body 20 after being released with respect to the device body 20.

The cover 40, for example, has a structure such that the length in the X-direction (orthogonal direction length), which is orthogonal to the facing direction, and the length in the Y-direction, which is also orthogonal to the facing direction, are larger than the overall thickness along the facing direction (−Z-direction). In other words, the cover 40 has a flat shape and has a small thickness in the −Z-direction.

Specifically, the cover 40 has an outer wall portion 42 which is arranged on the Z-direction side with respect to the device body 20, a side wall 44 which is arranged on the −X-direction side (one end side of the orthogonal direction) of the outer wall portion 42, and a side wall 46 which is arranged on the X-direction side (the other end side of the orthogonal direction) of the outer wall portion 42.

The outer wall portion 42 is, as an example, formed with a plate member of a quadrilateral shape (rectangular shape) in planar view (−Z-direction view). The side wall 44 is extended from a side on the −X-direction side of the outer wall portion 42 in the −Z-direction. The side wall 46 extends from a side on the X-direction side of the outer wall portion 42 in the −Z-direction.

Although not illustrated, the cover 40 also has side walls on the −Y-direction side and Y-direction side of the outer wall portion 42. In other words, the cover 40 is configured to have a box shape the −Z-direction side surface of which is opened.

On a corner portion 41 between the side wall 46 and outer wall portion 42, a rib 48 (an example of a restriction portion), which overhangs from the inner wall surface of the side wall 46 toward the −X-direction side, is formed. The rib 48 also overhangs in the −Z-direction in a view from the inner wall surface of the outer wall portion 42. As an example, a plurality of ribs 48 are arranged along the Y-direction at predetermined intervals. Further, the rib 48 has a predetermined gap S2 to a contact surface 26A of an inner wall portion 26, which will be described later.

When the cover 40 is moved in the −X-direction, the rib 48 contacts the contact surface 26A, and restricts movement of the cover 40 in the −X-direction beyond the contact point. In other words, the rib 48 restricts movement of the cover 40 with respect to the device body 20 in a direction along an opposite surface 32 (−X-direction) described below, which decreases an amount of overlap K1 by which a contact surface 52 (described below) overlaps the opposite surface 32, within a predetermined range.

On a corner portion 43 between the side wall 44 and outer wall portion 42, an overhang portion 49, which overhangs from the inner wall surface of the outer wall portion 42 toward the −Z-direction side, is formed. The overhang portion 49 also overhangs toward the X-direction side in a view from the inner wall surface of the side wall 44. As an example, a plurality of overhang portions 49 are arranged along the Y-direction at predetermined intervals.

On an X-direction side portion of a −Z-direction end portion of each overhang portion 49, an extended portion 47, which extends in the −Z-direction, is formed. On a leading end portion (−Z-direction end portion) of each extended portion 47, a claw portion 50 (an example of a contact portion) is formed. In other words, the claw portion 50 is formed on the device body 20 side (−Z-direction side) of the cover 40 and protrudes toward the device body 20 (−Z-direction side). By forming the claw portion 50 on every overhang portion 49, a plurality of claw portions 50 are arranged on the −X-direction end side (one end side of the orthogonal direction) of the cover 40 along the Y-direction at predetermined intervals.

The claw portion 50 is formed in a hook shape in side view (Y-direction view) so as to overhang in the X-direction. Specifically, the claw portion 50 has a contact surface 52 which faces in the Z-direction (below-mentioned separation direction), an X-direction side end surface 54, a −Z-direction side end surface 56, and a sloping surface 58 which is formed from a −Z-direction end of the X-direction side end surface 54 to an X-direction end of the −Z-direction side end surface 56. The contact surface 52 is a surface to be contacted by the opposite surface 32 (described below) and a flat surface along the X-direction. Furthermore the contact surface 52 may be a curved surface. Furthermore, the X-direction side end surface 54, −Z-direction side end surface 56, and sloping surface 58 may be either flat surfaces or curved surfaces.

The device body 20 has a frame 22, a functional section 24, an erect portion 28 which is disposed on the −X-direction end side (one end side of the orthogonal direction) of the frame 22, and an inner wall portion 26 formed on the X-direction end side (the other end side of the orthogonal direction) of the frame 22.

The frame 22 has, as an example, a size similar to the outer wall portion 42 and is formed with plate members of quadrilateral shapes (rectangular shapes) in planar view (−Z-direction view). Moreover, the frame 22 forms an outer wall on the −Z-direction side of the device body 20.

Specifically, the inner wall portion 26 is disposed on the X-direction end side of the frame 22 in the Z-direction. The surface on the X-direction side of the inner wall portion 26 is configured to be the contact surface 26A that may come into contact with the rib 48.

The functional section 24 has, as an example, a processing unit or the like that carries out digital processing of information. In other words, the functional section 24, which serves as the electronic device 10, is a portion that has predetermined functions. One end portion of a wiring 12 is connected to the functional section 24. The other end portion of the wiring 12 is connected to a connected section (not illustrated) disposed on the cover 40. The wiring 12 is arranged from a portion on the −X-direction end side of the device body 20 to a portion on the −X-direction end side of the cover 40.

The connected sections arranged on the cover 40 include, for example, an operation unit (operation switch) for operating the electronic device 10, a speaker, or the like.

The erect portion 28 is arranged, as an example, at a position facing each overhang portion 49 and the erect portions 28 are arranged in a number equal to the number of the overhang portions 49. A claw portion 30 is arranged up to a Z-direction end portion of the erect portion 28.

In other words, the claw portion 30 is formed on the cover 40 side (Z-direction side) of the device body 20 and protrudes toward the outer wall portion 42 of the cover 40 (Z-direction side). Moreover, the claw portion 30 is arranged on the outer wall portion 42 side (Z-direction side) of the cover 40 with respect to the claw portion 50.

The claw portion 30 is formed in a hook shape in side view (Y-direction view) so as to overhang in the −X-direction. Specifically, the claw portion 30 has an opposite surface 32 which faces in the −Z-direction, a −X-direction side end surface 34, a Z-direction side end surface 36, and a sloping surface 38, which is formed from a Z-direction end of the −X-direction side end surface 34 to a −X-direction end of the Z-direction side end surface 36.

The opposite surface 32 is a surface contacting the contact surface 52 and a flat surface along the X-direction. The opposite surface 32 may be a curved surface. The −X-direction side end surface 34, Z-direction side end surface 36, and sloping surface 38 may be either flat surfaces or curved surfaces.

The opposite surface 32 faces the contact surface 52 with a gap S1 therebetween. Specifically, the opposite surface 32 overlaps the contact surface 52 in the Z-direction view. With this configuration, when a −X-direction end portion of the cover 40 moves in a separation direction (Z-direction) in which the X-direction end portion of the cover 40 separates from a −X-direction end portion of the device body 20 (refer to FIGS. 2 and 3), the opposite surface 32 contacts the contact surface 52, and movement of the cover 40 in the separation direction beyond the contact point is suppressed. In other words, by the opposite surface 32, release of the cover 40 with respect to the device body 20 in the separation direction is suppressed.

Figure 2:
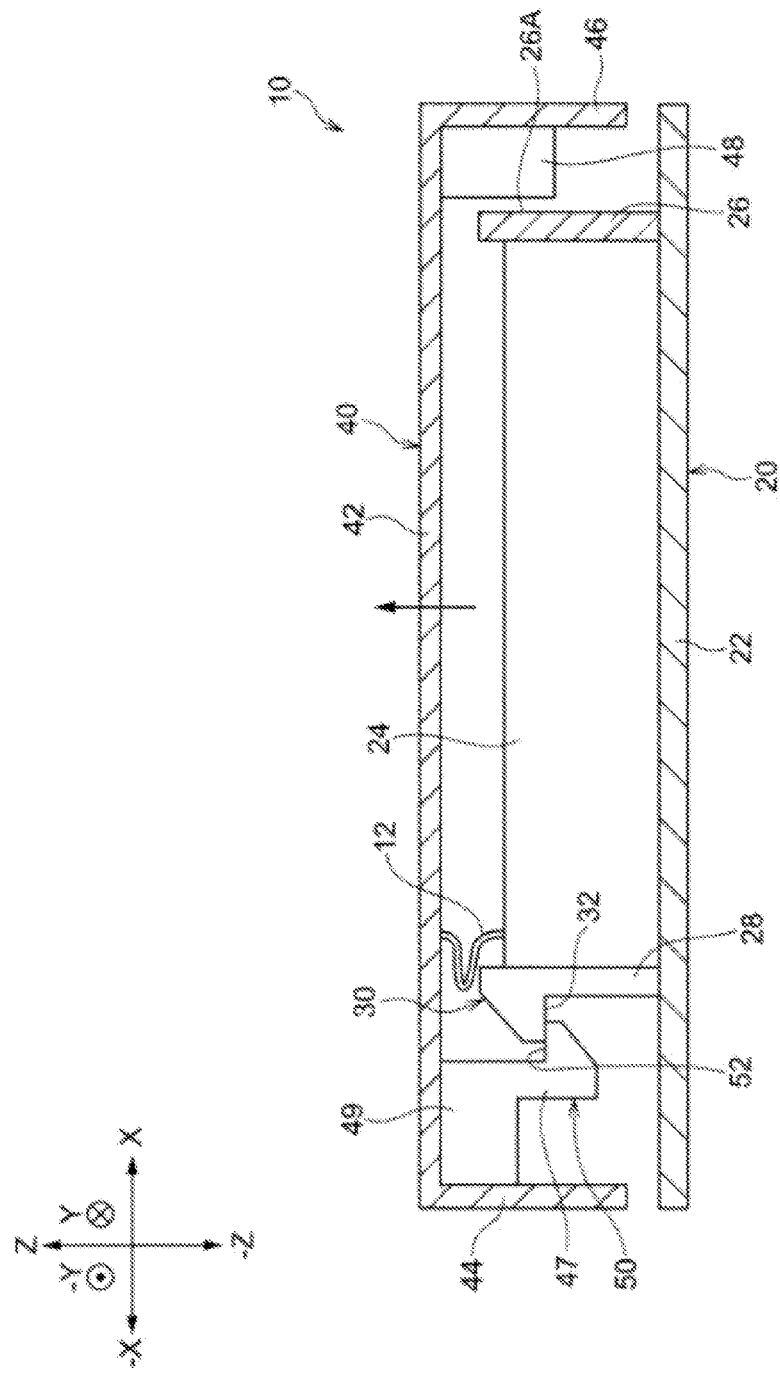
FIG. 2 is a sectional side view illustrating a state in which release of a cover is suppressed on the electronic device in FIG. 1.
Figure 3:
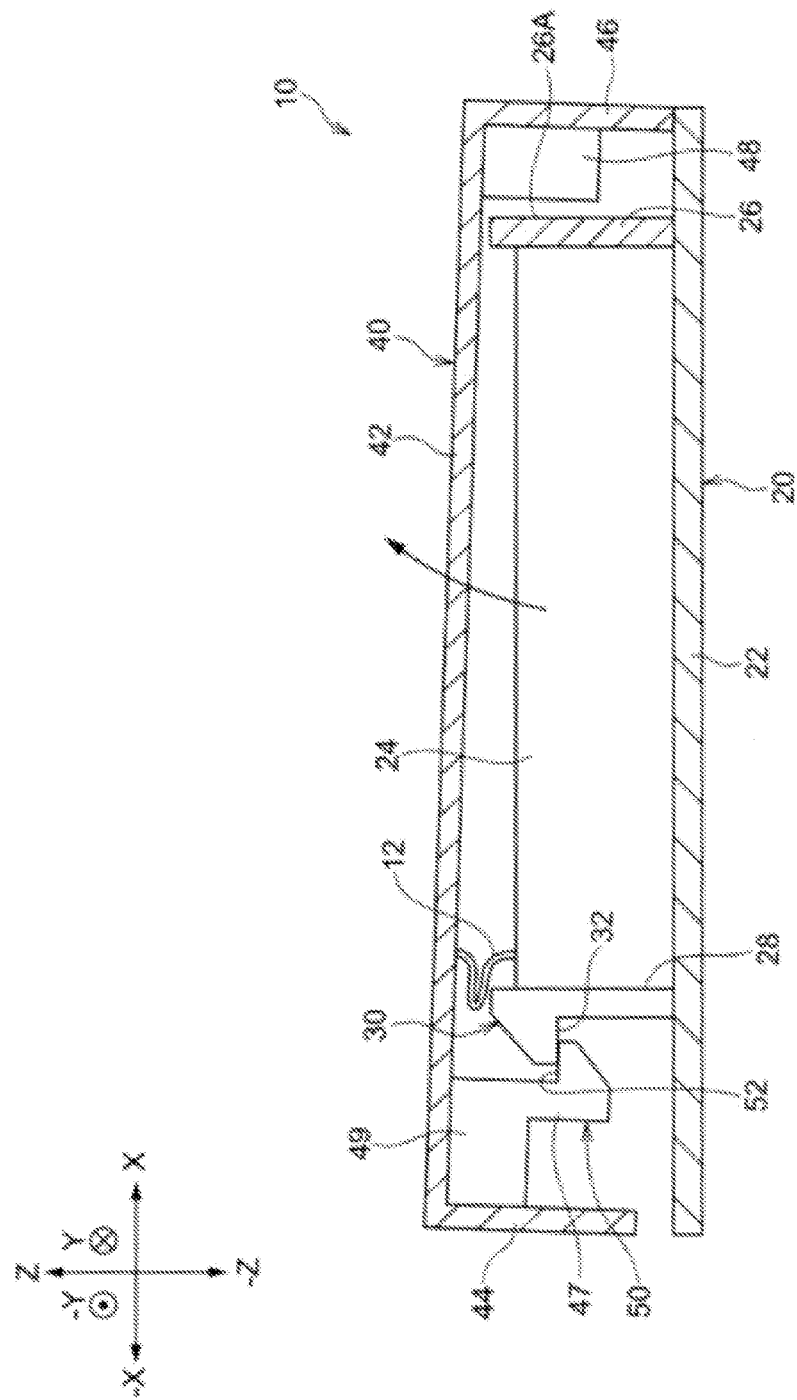
FIG. 3 is a sectional side view illustrating a state in which release of the cover is suppressed on the electronic device in FIG. 1.

Movements of the −X-direction end portion of the cover 40 in the separation direction include movement in which the −X-direction end portion and X-direction end portion of the cover 40 move in the Z-direction (refer to FIG. 2) and movement in which the −X-direction end portion of the cover 40 moves in the Z-direction with the X-direction end side of the cover 40 as a supporting point (refer to FIG. 3).

Moreover, in a state in which the cover 40 is attached to the device body 20, an amount of overlap K1 between the opposite surface 32 and contact surface 52 is configured to be larger than the gap S2 between the contact surface 26A of the inner wall portion 26 and the rib 48.

Figure 5:
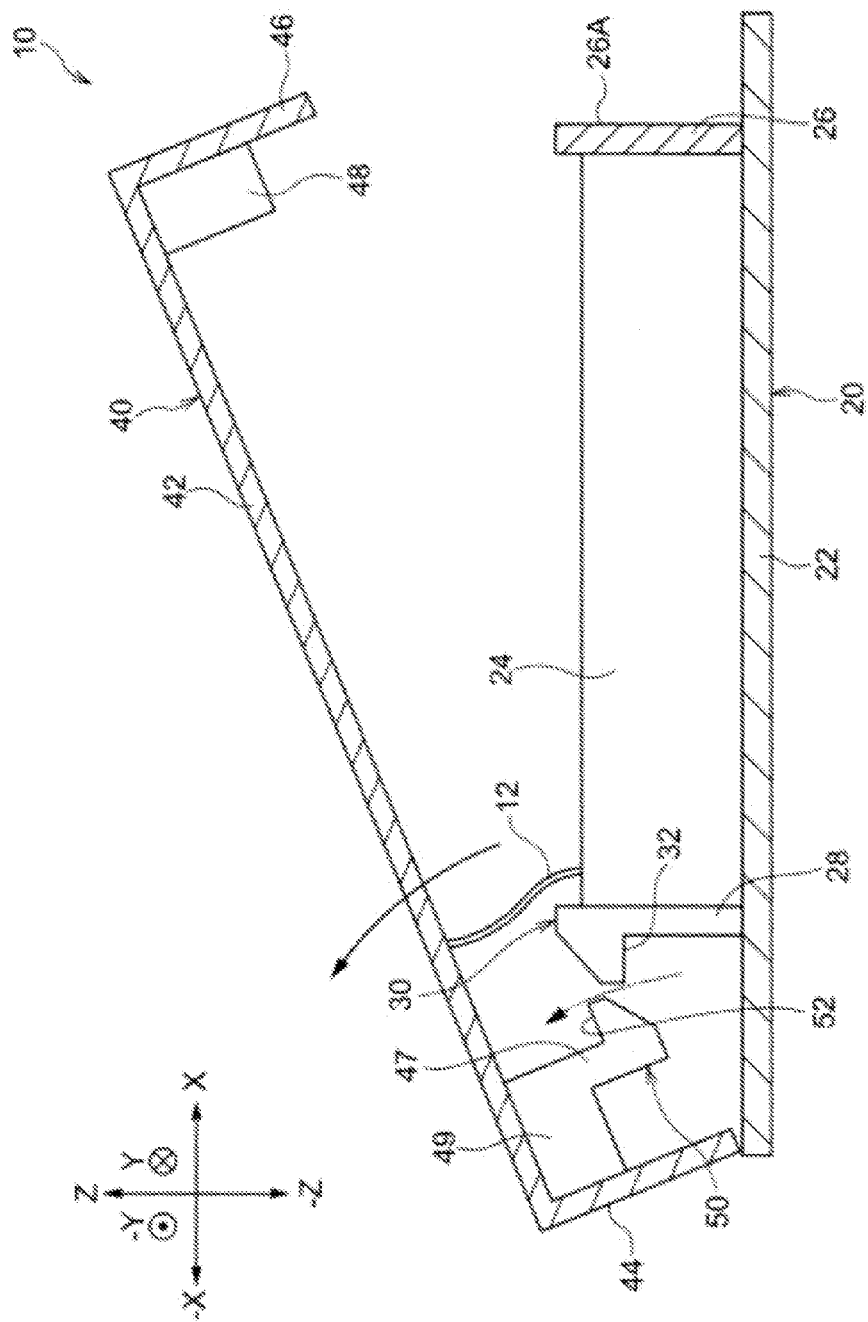
FIG. 5 is a sectional side view illustrating release movement of the cover in the electronic device in FIG. 1.

In addition, the gap S1 is set to a length at which the opposite surface 32 does not reach a path of the movement of the contact surface 52 when the X-direction end portion of the cover 40 rotates with the −X-direction end side of the cover 40 as a supporting point so as to separate from the X-direction end portion of the device body 20 (refer to FIG. 5). In other words, in the rotation, the opposite surface 32 of the claw portion 30 is configured not to suppress movement of the claw portion 50. Therefore, release of the cover 40 by the rotation is allowed.

Furthermore, in the rotation with the −X-direction end side of the cover 40 as a supporting point, the claw portion 50 and claw portion 30 guide the cover 40 in the rotation direction by contacting each other in a way other than the contact between the opposite surface 32 and contact surface 52. Specifically, for example, a corner portion 53 between the contact surface 52 and the X-direction side end surface 54 and the X-direction side end surface 54 contact the opposite surface 32 of the claw portion 30, a corner portion 33 between the opposite surface 32 and the −X-direction side end surface 34, and the −X-direction side end surface 34.

Accordingly, in the rotation with the X-direction end side of the cover 40 as a supporting point, the opposite surface 32 may contact a portion of the claw portion 50 other than the contact surface 52 as long as the rotation is not suppressed. In the rotation with the X-direction end side of the cover 40 as a supporting point, however, the claw portion 50 and claw portion 30 may not contact each other. Moreover, the direction of the rotation is not limited to an arc of an exact circle but may be an arc of an irregular shape. Further, in the rotation, a portion of the cover 40 that is to serve as a supporting point may change with the rotation.

In the first embodiment, when the cover 40 is attached to the device body 20, the sloping surface 38 of the claw portion 30 contacts the sloping surface 58 of the claw portion 50, and the extended portion 47 of the claw portion 50 is configured to be deformed elastically in the −X-direction by the contact. It is sufficient, however, that at least either of the portion on which the claw portion 30 is formed or the portion on which the claw portion 50 is formed is capable of elastic deformation.

Effects of the First Embodiment

Next, effects of the first embodiment will be described below.

According to the electronic device 10 of the first embodiment, as illustrated in FIG. 2, when the −X-direction end portion and the X-direction end portion of the cover 40 are moved in the Z-direction, the opposite surface 32 contacts the contact surface 52, and movement of the cover 40 in the Z-direction beyond the contact point is suppressed. In addition, as illustrated in FIG. 3, when the −X-direction end portion of the cover 40 is moved in the Z-direction with the X-direction end side of the cover 40 as a supporting point, the opposite surface 32 also contacts the contact surface 52, and movement of the cover 40 in the Z-direction beyond the contact point is suppressed similarly.

As described above, by the opposite surface 32, release of the cover 40, in which the −X-direction end portion of the cover 40 is moved in the Z-direction, is suppressed.

Figure 4:
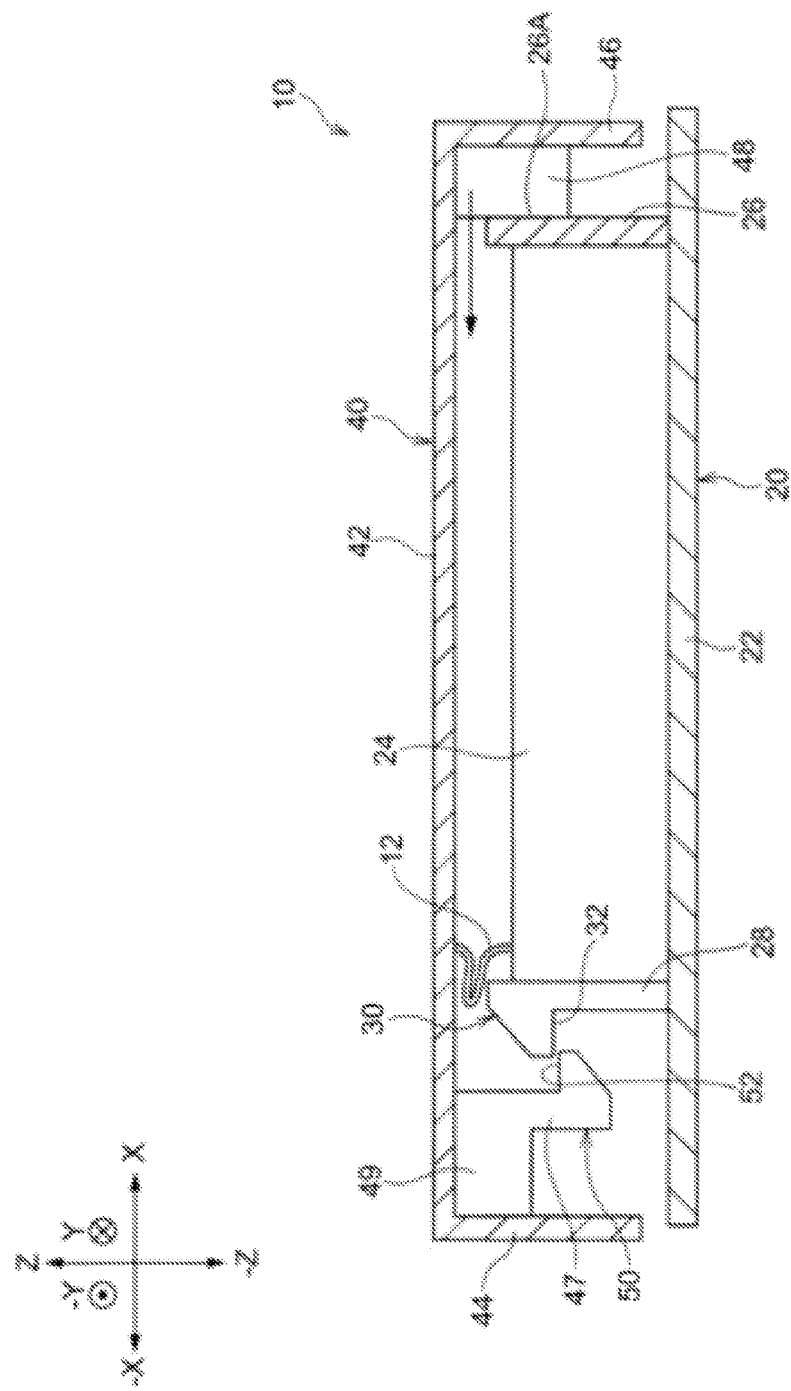
FIG. 4 is a sectional side view illustrating a state in which movement of the cover is suppressed on the electronic device in FIG. 1.

Furthermore, as illustrated in FIG. 4, when the cover 40 is moved in the −X-direction, the rib 48 contacts the contact surface 26A, and movement of the cover 40 in the −X-direction beyond the contact point is restricted. Therefore, displacement of the contact surface 52 from the opposite surface 32 in the −X-direction is suppressed.

Particularly, in the first embodiment, the amount of overlap K1 between the opposite surface 32 and contact surface 52 is configured to be larger than the gap S2 between the contact surface 26A of the inner wall portion 26 and rib 48. Therefore, even at a contact point where the rib 48 contacts the contact surface 26A, a state in which the contact surface 52 overlaps the opposite surface 32 is maintained.

Accordingly, even when the −X-direction end portion of the cover 40 is moved in the Z-direction from the contact point where the rib 48 contacts the contact surface 26A, the opposite surface 32 contacts the contact surface 52 and movement of the cover 40 in the Z-direction (separation direction) beyond the contact point is suppressed.

Moreover, in the first embodiment, as illustrated in FIG. 5, when the cover 40 is rotated with the −X-direction end side of the cover 40 as a supporting point in such a way that the X-direction end portion of the cover 40 separates from the X-direction end portion of the device body 20, the opposite surface 32 of the claw portion 30 does not suppress the movement of the claw portion 50. With this configuration, the cover 40 is rotated.

Furthermore, in the rotation with the −X-direction end side of the cover 40 as a supporting point, the claw portion 50 is guided by the claw portion 30, and the cover 40 is released. With this configuration, the cover 40 is rotated in the rotation direction smoothly.

As described above, in the first embodiment, by the rotation with the −X-direction end side of the cover 40 as a supporting point, the cover 40 is released with respect to the device body 20 and separated from the device body 20.

In the first embodiment, the length of the gap S1 between the opposite surface 32 of the claw portion 30 and the contact surface 52 of the claw portion 50 is configured so that the opposite surface 32 does not reach a path of the movement of the contact surface 52 when the cover 40 is rotated with the −X-direction end side of the cover 40 as a supporting point. In other words, in the first embodiment, by adjusting a positional relationship between the claw portion 30 and claw portion 50, movement direction in which movement of the claw portion 30 is suppressed and movement direction in which movement of the claw portion 30 is not suppressed are defined. The movement direction in which movement of the claw portion 30 is suppressed is the direction in which the cover 40 is not released. The movement direction in which movement of the claw portion 30 is not suppressed is the direction in which the cover 40 is released.

As described above, because release directions of the cover 40 are defined depending on whether or not the movement of the claw portion 30 is suppressed by the claw portion 50, the release directions of the cover 40 with respect to the device body 20 may be defined without adding a component other than the claw portion 50 and claw portion 30. In other words, compared with a case in which a component other than the claw portion 50 and claw portion 30 is desirable, the release directions of the cover 40 with respect to the device body 20 may be defined using a simple structure.

In the first embodiment, because the wiring 12 is connected on the side where a supporting point, used when the cover 40 is rotated to be released, is located (−X-direction end side), it is difficult for the wiring 12 to be drawn when the cover 40 is released with respect to the device body 20. Therefore, damage to the wiring 12 may be suppressed.

Moreover, as described above, because the release directions of the cover 40 with respect to the device body 20 are defined by the claw portion 30 and claw portion 50, compared with a case in which a hinge or the like is used, the structure of the electronic device 10 itself becomes simple. Further, because the structure of the device body 20 of the electronic device 10 does not have to be strengthened, it is possible to make the electronic device 10 thinner and lighter.

The cover 40 separated from the device body 20 is attached to the device body 20 in the −Z-direction. At this time, the sloping surface 58 of the claw portion 50 contacts the sloping surface 38 of the claw portion 30, and the extended portion 47 is elastically deformed in the −X-direction. With this configuration, attachment of the cover 40 to the device body 20 and assembly of the cover 40 become easy.

Second Embodiment

Next, as a second embodiment, a screen display device 100 (an example of the electronic device) to which techniques disclosed herein are applied will be described below.

Figure 6:
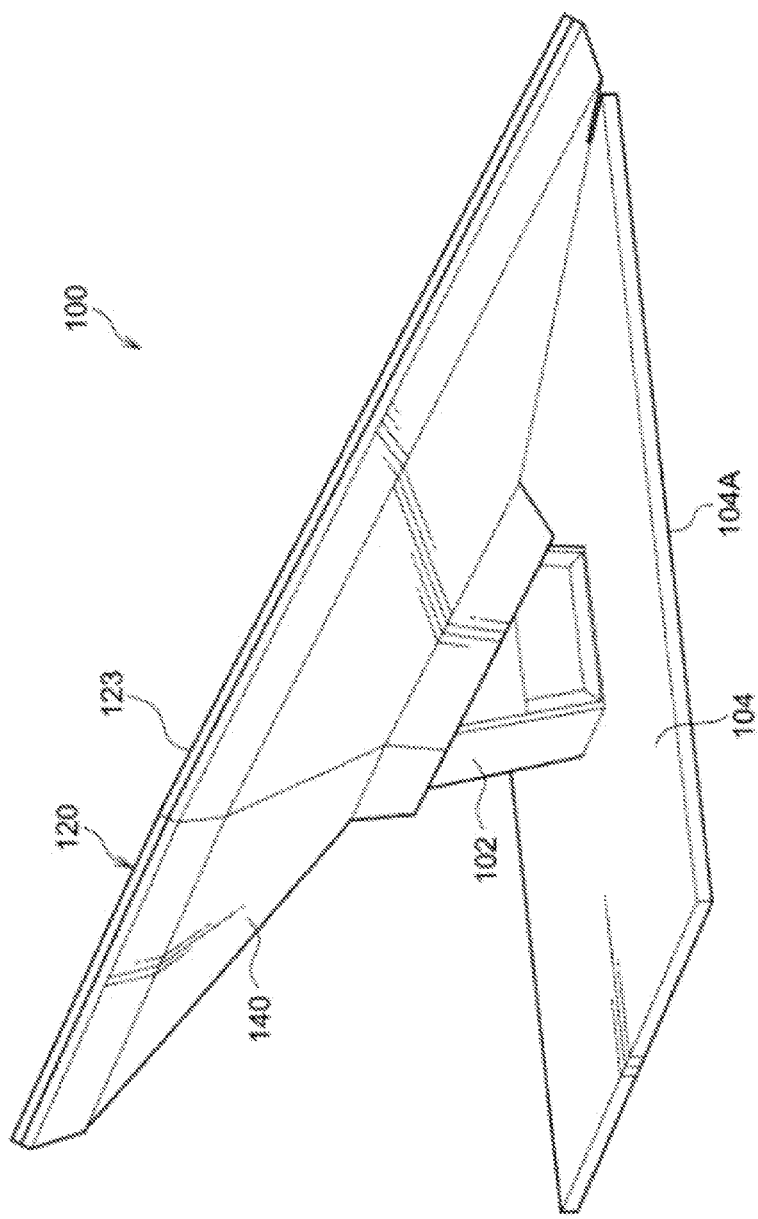
FIG. 6 is a perspective view illustrating an external appearance of a screen display device according to a second embodiment.
Figure 7:
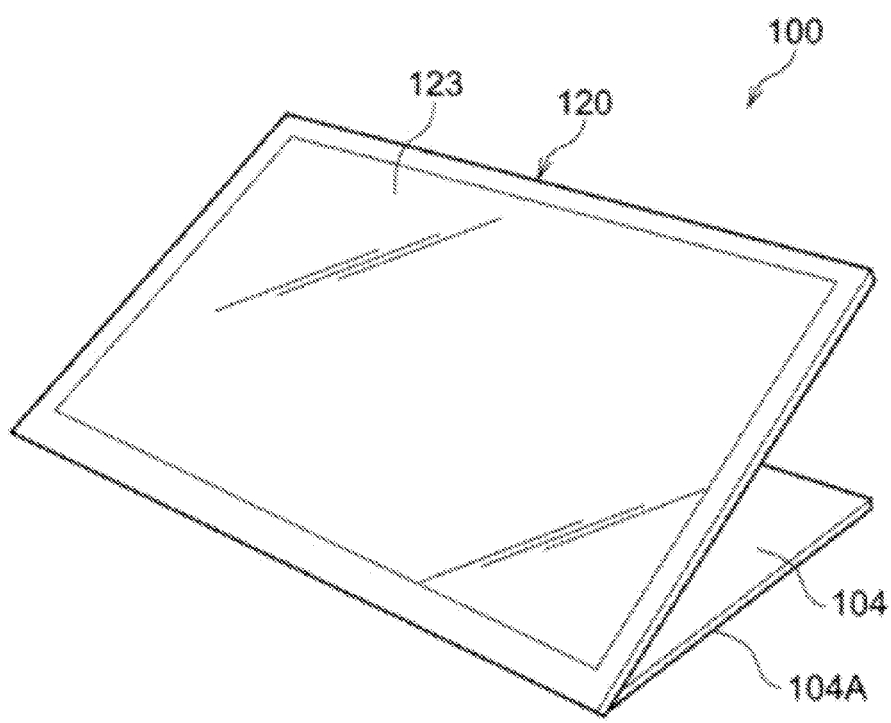
FIG. 7 is a perspective view illustrating a usage example of the screen display device in FIG. 6.
Figure 8:
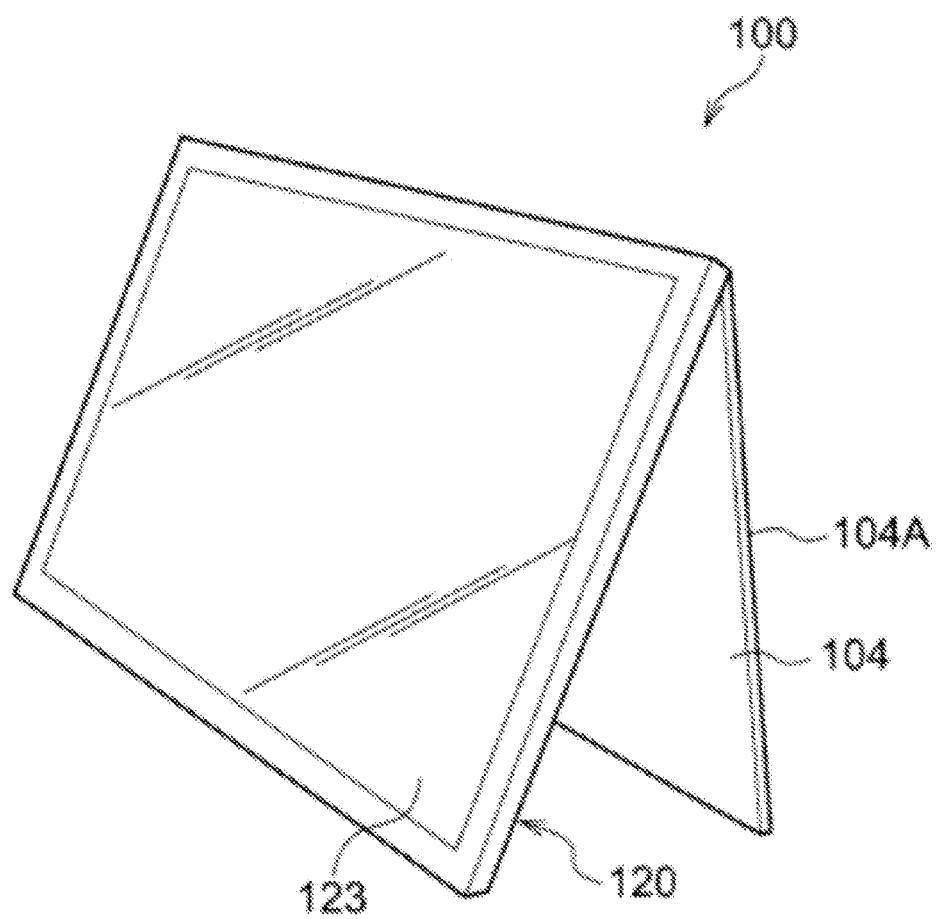
FIG. 8 is a perspective view illustrating a usage example of the screen display device in FIG. 6.

The screen display device 100 has, as illustrated in FIG. 6, a device body 120 (an example of the device body) having a screen display section 123 (refer to FIG. 7) which displays a screen and a cover 140 which is attached to the device body 120. To the cover 140, a stand 104 is attached via a hinge 102. As an example, as illustrated in FIGS. 6 and 7, the screen display device 100 may be used by placing the screen display device 100 on a base (not illustrated) so that a back surface 104A of the stand 104 faces downward. At this time, the screen display section 123 is angled so as to be slanted against the base (not illustrated). In addition, as another example, as illustrated in FIG. 8, the screen display device 100 may be used by placing the screen display device 100 on a base (not illustrated) so that the device body 120 is leaned against the stand 104 and angling the screen display section 123 so as to be slanted.

Figure 9:
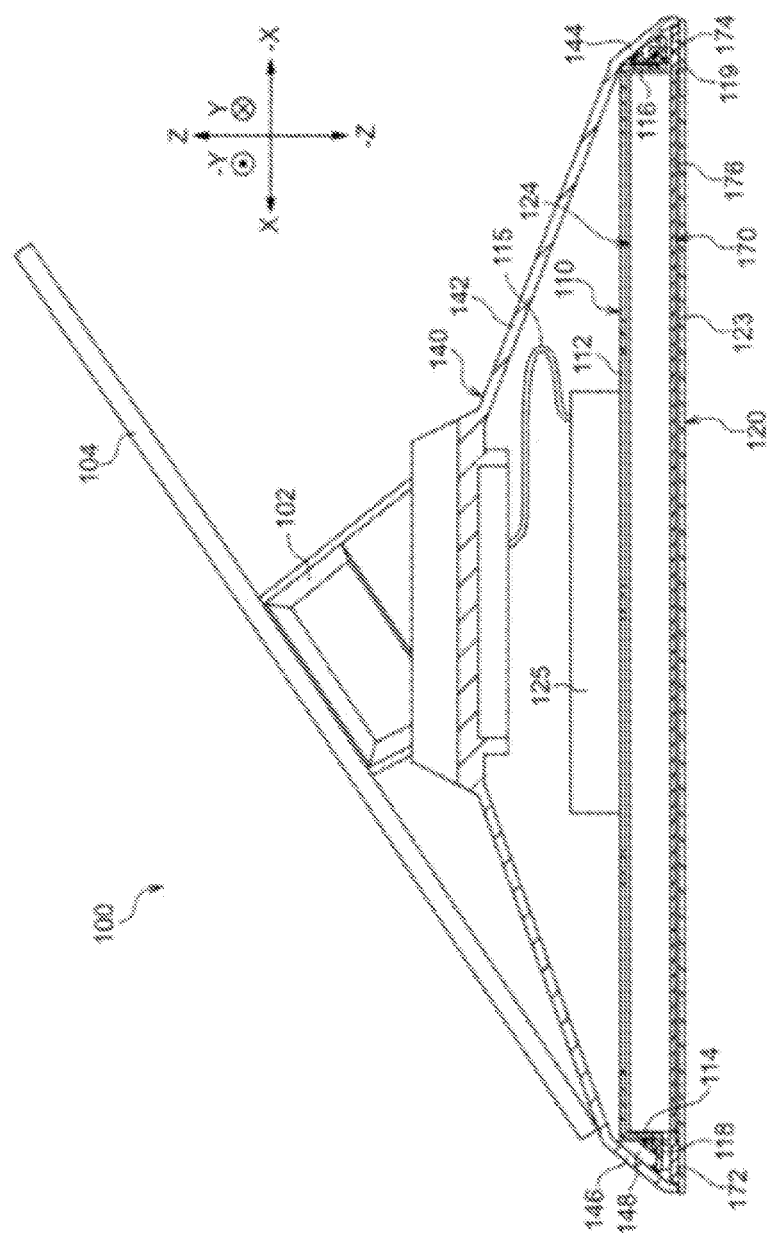
FIG. 9 is a sectional side view of the screen display device in FIG. 6.

As illustrated in FIG. 9, specifically, the cover 140 is attached to the device body 120 in a state in which the cover 140 faces the device body 120 in the −Z-direction (facing direction).

Moreover, as an example, the cover 140 is fixed to the device body 120 by fastening members (not illustrated) such as screws. In other words, the cover 140 may be released with respect to the device body 120 by removing the fastening members (not illustrated) such as screws. Furthermore, the cover 140 is configured to become separated from the device body 120 after being released with respect to the device body 120. The fastening members (not illustrated) such as screws, for example, are fastened at four corners of an outer wall section 142 described below (refer to FIG. 10).

The cover 140, as illustrated in FIG. 9, for example, has a structure such that the length in the X-direction (orthogonal direction length), which is orthogonal to the facing direction, and the length in the Y-direction, which is also orthogonal to the facing direction, are larger than the overall thickness along the facing direction (−Z-direction). In other words, the cover 140 has a flat shape and has a small thickness in the −Z-direction.

Specifically, the cover 140 has an outer wall section 142 which is arranged along the Z-direction side with respect to the device body 120 and a side wall 144 which is formed on the −X-direction side (one end side of the orthogonal direction) of the outer wall section 142. Further, the cover 140 has a side wall 146 which is formed on the X-direction side (the other end side of the orthogonal direction) of the outer wall section 142.

The outer wall section 142 is, as an example, formed with a plate member of a quadrilateral shape (rectangular shape) in planar view (−Z-direction view). The side wall 144 extends from a side on the −X-direction side of the outer wall section 142 toward the −Z-direction side. The side wall 146 is extended from a side on the X-direction side of the outer wall section 142 toward the −Z-direction side.

The cover 140 also has side walls 143 and 145 (refer to FIG. 10) on the −Y-direction side and Y-direction side of the outer wall section 142, respectively. In other words, the cover 140 is configured to have a box shape the −Z-direction side surface of which is opened.

Figure 10:
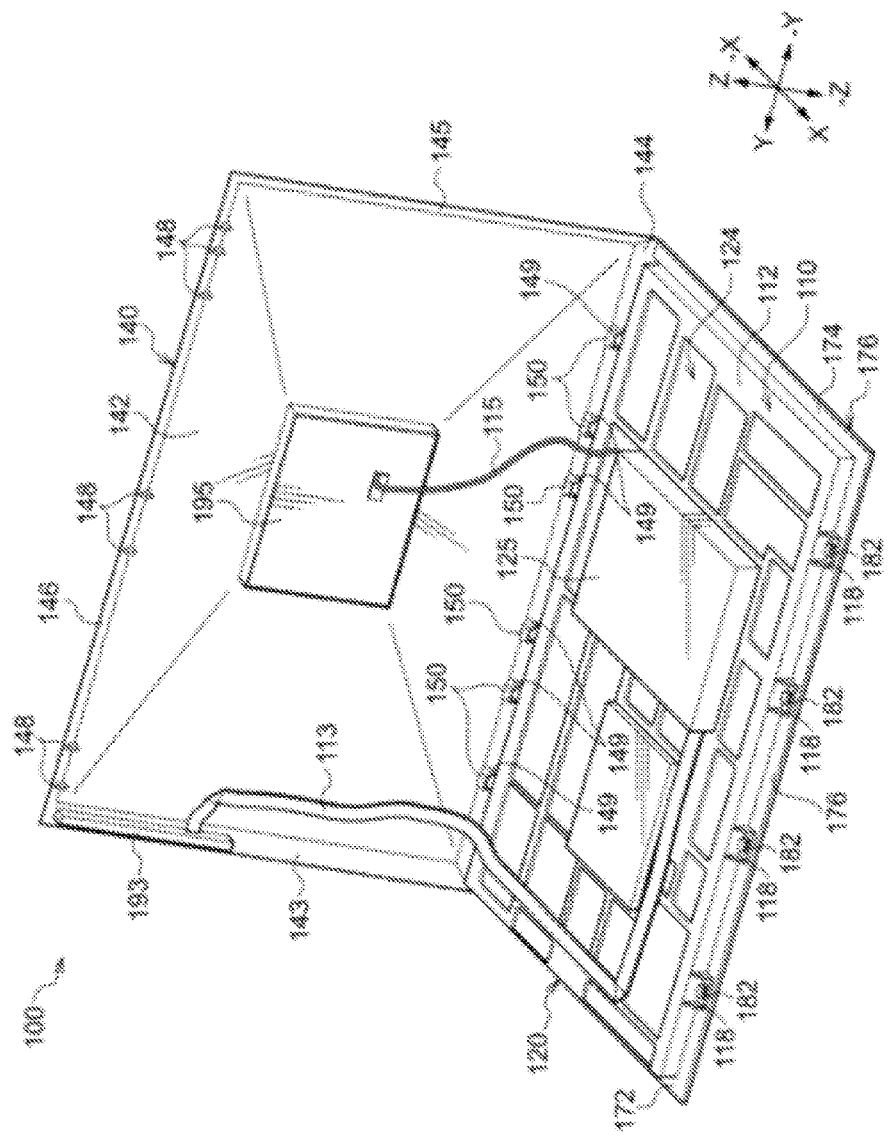
FIG. 10 is a perspective view illustrating a state in which a cover is released on the screen display device in FIG. 6.
Figure 11:
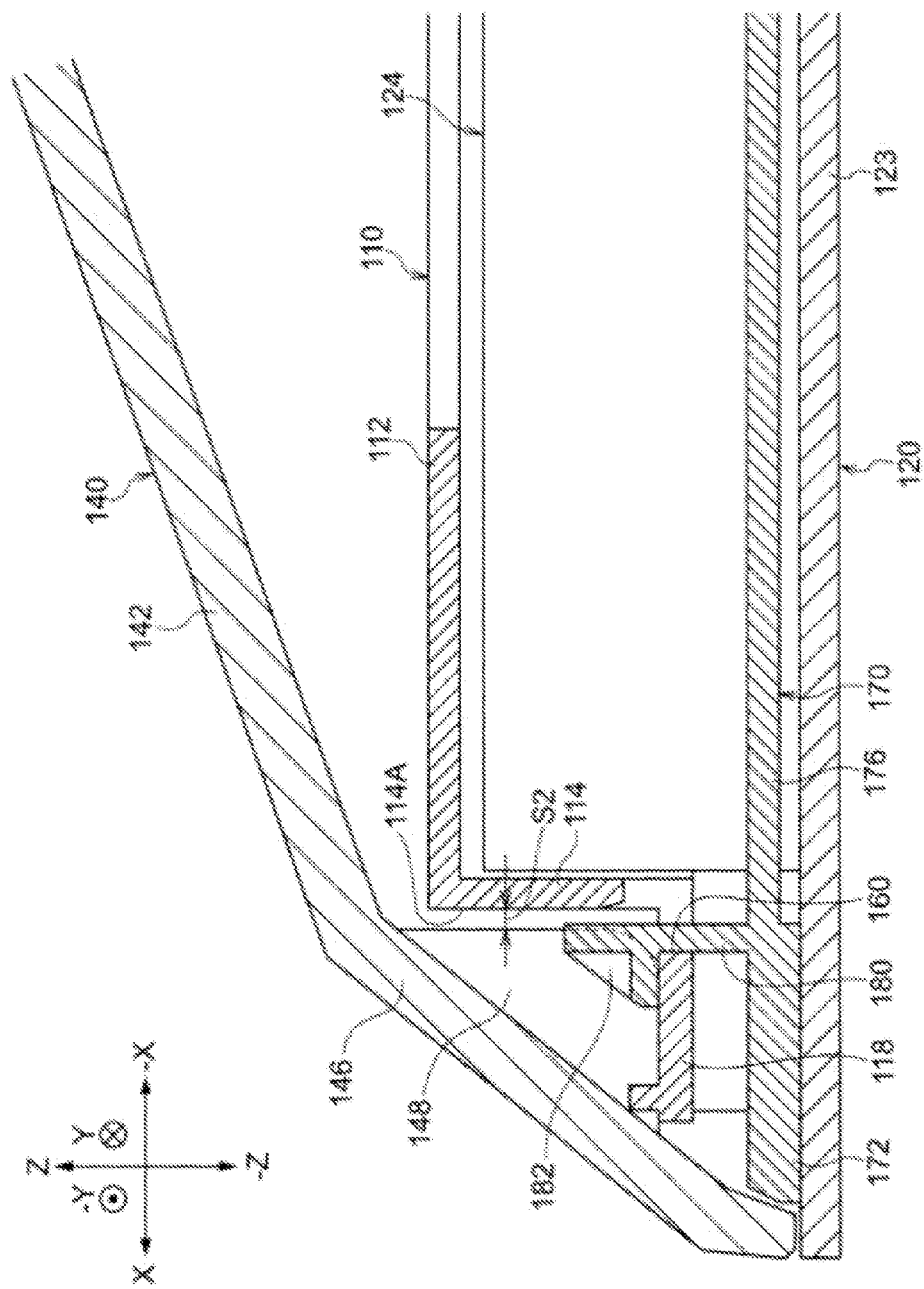
FIG. 11 is an enlarged sectional side view illustrating an X-direction side portion of the screen display device in FIG. 9.

On the side wall 146, as illustrated in FIG. 11, a rib 148 (an example of a restriction portion), which overhangs from an inner wall surface of the side wall 146 toward the −X-direction side, is formed. As an example, a plurality of ribs 148 are arranged along the Y-direction at predetermined intervals (refer to FIG. 10). Further, the rib 148 has a predetermined gap S2 to a contact surface 114A (described below) of the side surface frame portion 114.

When the cover 140 moves in the −X-direction, the rib 148 contacts the contact surface 114A of the side surface frame portion 114 and restricts the movement of the cover 140 in the −X-direction beyond the contact point. In other words, the rib 148 restricts the movement of the cover 140 with respect to the device body 120 in a direction along an opposite surface 132 (−X-direction) (described below), which decreases an amount of overlap K1 by which a contact surface 152 (described below) overlaps the opposite surface 132, within a predetermined range.

Figure 12:
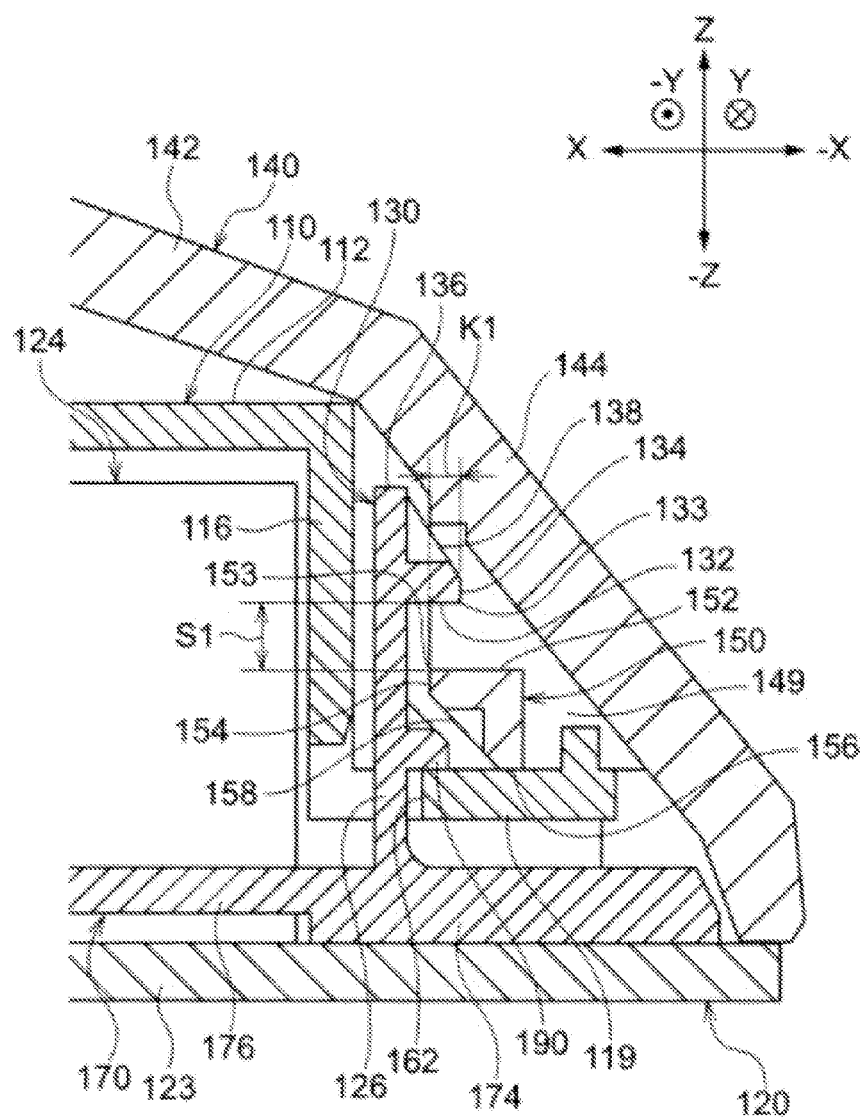
FIG. 12 is an enlarged sectional side view illustrating a −X-direction side portion of the screen display device in FIG. 9.

On the side wall 144, as illustrated in FIG. 12, an overhang portion 149, which overhangs toward the X-direction side viewed from the inner wall surface of the side wall 144, is formed. As an example, a plurality of overhang portions 149 are arranged along the Y-direction at predetermined intervals.

On an X-direction side portion in a −Z-direction end portion of each overhang portion 149, a claw portion 150 (an example of a contact portion) is formed. In other words, the claw portion 150 is formed on the device body 120 side (−Z-direction side) of the cover 140 and protrudes toward the device body 120 (−Z-direction side). By forming the claw portion 150 on every overhang portion 149, a plurality of claw portions 150 are arranged on the −X-direction end side (one end side of the orthogonal direction) of the cover 140 along the Y-direction at predetermined intervals.

The claw portion 150 is formed in a hook shape in side view (Y-direction view) so as to overhang in the X-direction. Specifically, the claw portion 150 has a contact surface 152 which faces in the Z-direction (below-mentioned separation direction), an X-direction side end surface 154, a −Z-direction side end surface 156, and a sloping surface 158 which is formed from a −Z-direction end of the X-direction side end surface 154 to an X-direction end of the −Z-direction side end surface 156. The contact surface 152 is a surface to be contacted by an opposite surface 132 (described below) and a flat surface along the X-direction. The contact surface 152 may be a curved surface. Furthermore, the X-direction side end surface 154, −Z-direction side end surface 156, and sloping surface 158 may be either flat surfaces or curved surfaces.

The device body 120 has, as illustrated in FIG. 9, a screen display unit 124 (an example of a component) which includes a screen display section 123, a first frame 110 which holds the screen display unit 124, and a second frame 170.

The first frame 110 has a back surface frame portion 112 which is arranged on the back surface side (Z-direction side) of the screen display unit 124 and side surface frame portions 114 and 116 which are arranged on both side surface sides (X-direction side and −X-direction side) of the screen display unit 124. The surface on the X-direction side of the side surface frame portion 114 is configured to be a contact surface 114A (refer to FIG. 11) that may come into contact with the rib 148.

Furthermore, the first frame 110 has, as illustrated in FIGS. 11 and 12, front side frame portions 118 and 119, which are arranged on the front side (−Z-direction side) of the side surface frame portions 114 and 116, respectively. In the front side frame portions 118 and 119, insertion holes 160 and 162, into which claw portions 182 and 190 (described below) are inserted, are formed.

The second frame 170 has a −X-direction side frame portion 174 arranged on the −X-direction side (one end side of the orthogonal direction) of the screen display unit 124 and an X-direction side frame portion 172 arranged on the X-direction side (the other end side of the orthogonal direction) of the screen display unit 124. Further, the second frame 170 has a −Y-direction side frame portion 176 which is arranged on the −Y-direction side of the screen display unit 124 and a Y-direction side frame portion (not illustrated) arranged on the Y-direction side of the screen display unit 124. In other words, the second frame 170 is formed in a case shape so as to enclose side surfaces of X-direction, −X-direction, Y-direction, and −Y-direction of the screen display unit 124.

On the X-direction side frame portion 172, as illustrated in FIG. 11, an erect portion 180, which is disposed in the Z-direction from the X-direction side frame portion 172, is formed. On a tip portion (Z-direction end portion) of the erect portion 180, a claw portion 182 is formed. The claw portion 182 is inserted in the Z-direction side through the insertion hole 160 of the front side frame portion 118. With this configuration, the claw portion 182 is positioned to the cover 140 side (Z-direction side) with respect to the front side frame portion 118. This claw portion 182 is formed in a hook shape in side view (Y-direction side) so as to overhang in the X-direction. With this structure, the front side frame portion 118 (X-direction side portion) of the first frame 110 is locked to the second frame 170.

On the −X-direction side frame portion 174, as illustrated in FIG. 12, an erect portion 126, which is disposed in the Z-direction from the −X-direction side frame portion 174, is formed. On a middle portion in the erection direction of the erect portion 126, a claw portion 190 (an example of a locking portion) is formed. The claw portion 190 is inserted in the Z-direction side through the insertion hole 162 of the front side frame portion 119. With this configuration, the claw portion 190 is positioned to the cover 140 side (Z-direction side) with respect to the front side frame portion 119. This claw portion 190 is formed in a hook shape in side view (Y-direction view) so as to overhang in the −X-direction. With this structure, the front side frame portion 119 (−X-direction side portion) of the first frame 110 is locked to the second frame 170. The screen display unit 124 is thus held to the second frame 170 via the first frame 110.

On the Z-direction side of the screen display unit 124, as illustrated in FIG. 9, a processing unit 125, which carries out digital processing of information, is fixed. To the processing unit 125, as illustrated in FIG. 10, one end portion of each of wirings 113 and 115 is connected. The other end portions of the wirings 113 and 115 are connected to an operation section (operation switch) 193, which is disposed to the cover 140 for the operation of the screen display device 100, and a speaker 195. These wirings 113 and 115 are arranged from a portion on the −X-direction end side of the device body 120 to a portion on the −X-direction end side of the cover 140.

In the second embodiment, as illustrated in FIG. 12, a claw portion 130 is formed on a tip portion (Z-direction end portion) of the erect portion 126. In other words, the claw portion 130 is formed on the cover 140 side (Z-direction side) of the device body 120 and protrudes toward the outer wall section 142 of the cover 140 (Z-direction side). In addition, the claw portion 130 is arranged on the outer wall section 142 side (Z-direction side) of the cover 140 with respect to the claw portion 150.

The claw portion 130 is formed in a hook shape in side view (Y-direction view) so as to overhang in the −X-direction. Specifically, the claw portion 130 has an opposite surface 132 which faces in the −Z-direction, a −X-direction side end surface 134, a Z-direction side end surface 136, and a sloping surface 138, which is formed from a Z-direction end of the −X-direction side end surface 134 to a −X-direction end of the Z-direction side end surface 136.

The opposite surface 132 is a surface contacting the contact surface 152 and a flat surface along the X-direction. The opposite surface 132 may be a curved surface. The −X-direction side end surface 134, Z-direction side end surface 136, and sloping surface 138 may be either flat surfaces or curved surfaces.

The opposite surface 132 faces the contact surface 152 with a gap S1 therebetween. Specifically, the opposite surface 132 overlaps the contact surface 152 in the Z-direction view. With this configuration, when the −X-direction end portion of the cover 140 moves in the separation direction (Z-direction) in which the −X-direction end portion of the cover 140 separates from the −X-direction end portion of the device body 120 (refer to FIG. 13), the opposite surface 132 contacts the contact surface 152, and movement of the cover 140 in the separation direction beyond the contact point is suppressed. In other words, by the opposite surface 132, release of the cover 140 with respect to the device body 120 in the separation direction is suppressed.

Movements of the −X-direction end portion of the cover 140 in the separation direction include movement in which the −X-direction end portion and X-direction end portion of the cover 140 move in the Z-direction and movement in which the −X-direction end portion of the cover 140 moves in the Z-direction with the X-direction end side of the cover 140 as a supporting point.

Moreover, in a state in which the cover 140 is attached to the device body 120, the amount of overlap K1 between the opposite surface 132 and contact surface 152 is configured to be larger than the gap S2 between the contact surface 114A of the side surface frame portion 114 and the rib 148.

Figure 14:
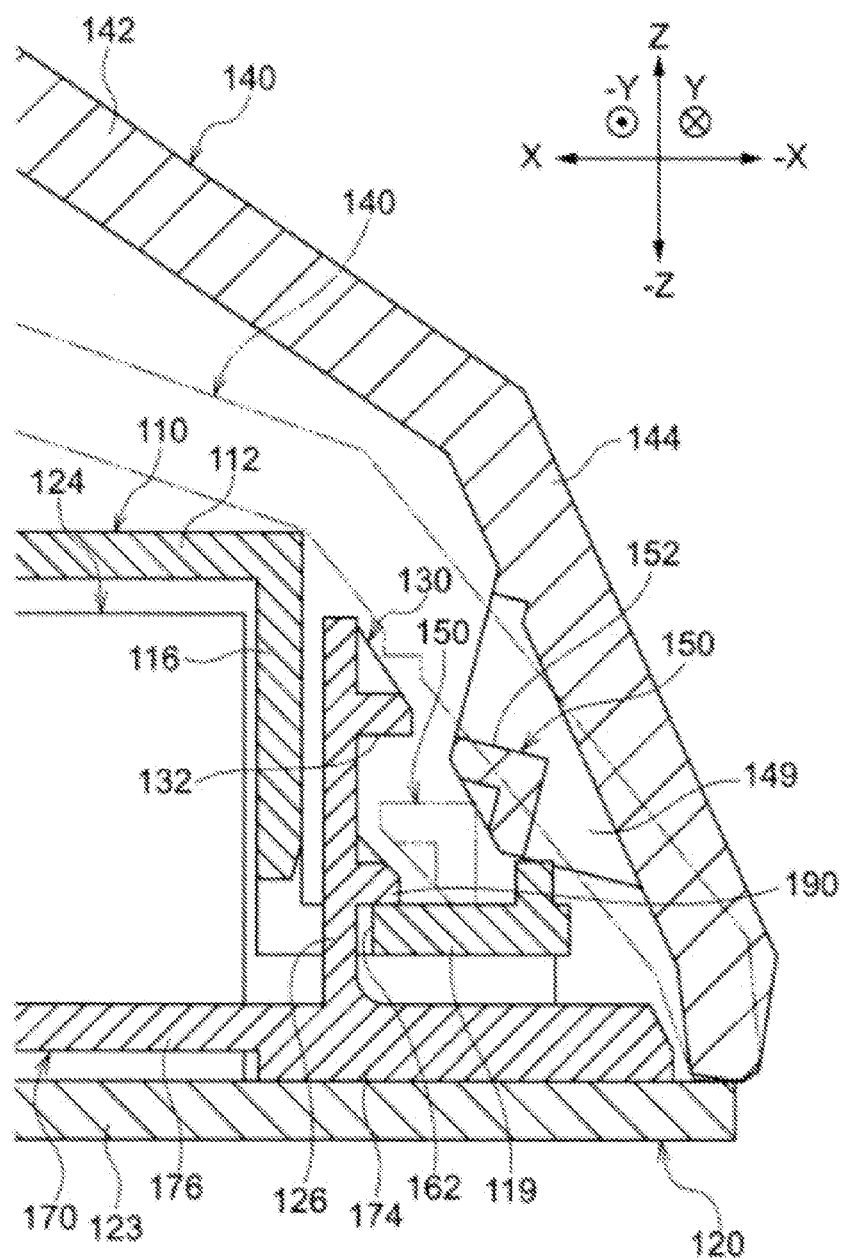
FIG. 14 is a sectional side view illustrating release movement of the cover on the screen display device in FIG. 12.

In addition, the gap S1 is set to a length at which the opposite surface 132 does not reach a path of the movement of the contact surface 152 when the X-direction end portion of the cover 140 rotates with the −X-direction end side of the cover 140 as a supporting point so as to separate from the X-direction end portion of the device body 120 (refer to FIG. 14). In other words, in the rotation, the opposite surface 132 of the claw portion 130 is configured not to suppress the movement of the claw portion 150. Therefore, release of the cover 140 by the rotation is allowed.

Furthermore, in the rotation with the −X-direction end side of the cover 140 as a supporting point, the claw portion 150 and claw portion 130 guide the cover 140 in the rotation direction by contacting each other in a way other than the contact between the opposite surface 132 and the contact surface 152. Specifically, for example, a corner portion 153 between the contact surface 152 and X-direction side end surface 154 and the X-direction side end surface 154 contact the opposite surface 132 of the claw portion 130, a corner portion 133 between the opposite surface 132 and −X-direction side end surface 134, and the −X-direction side end surface 134.

Accordingly, in the rotation with the X-direction end side of the cover 140 as a supporting point, the opposite surface 132 may contact a portion of the claw portion 150 other than the contact surface 152 as long as the rotation is not suppressed. In the rotation with the X-direction end side of the cover 140 as a supporting point, however, the claw portion 150 and claw portion 130 may not contact each other. In addition, the rotation direction of the rotation is not limited to an arc of an exact circle but may be an arc of an irregular shape. Further, in the rotation, a portion of the cover 140 that is to serve as a supporting point may change with the rotation.

In the second embodiment, when the cover 140 is attached to the device body 120, the sloping surface 138 of the claw portion 130 contacts the sloping surface 158 of the claw portion 150, and the erect portion 126 of the claw portion 130 is configured to be deformed elastically in the X-direction by the contact. It is sufficient, however, that at least either of a portion on which the claw portion 130 is formed or a portion on which the claw portion 150 is formed is capable of elastic deformation.

Effects of the Second Embodiment

Next, effects of the second embodiment will be described below.

Figure 13:
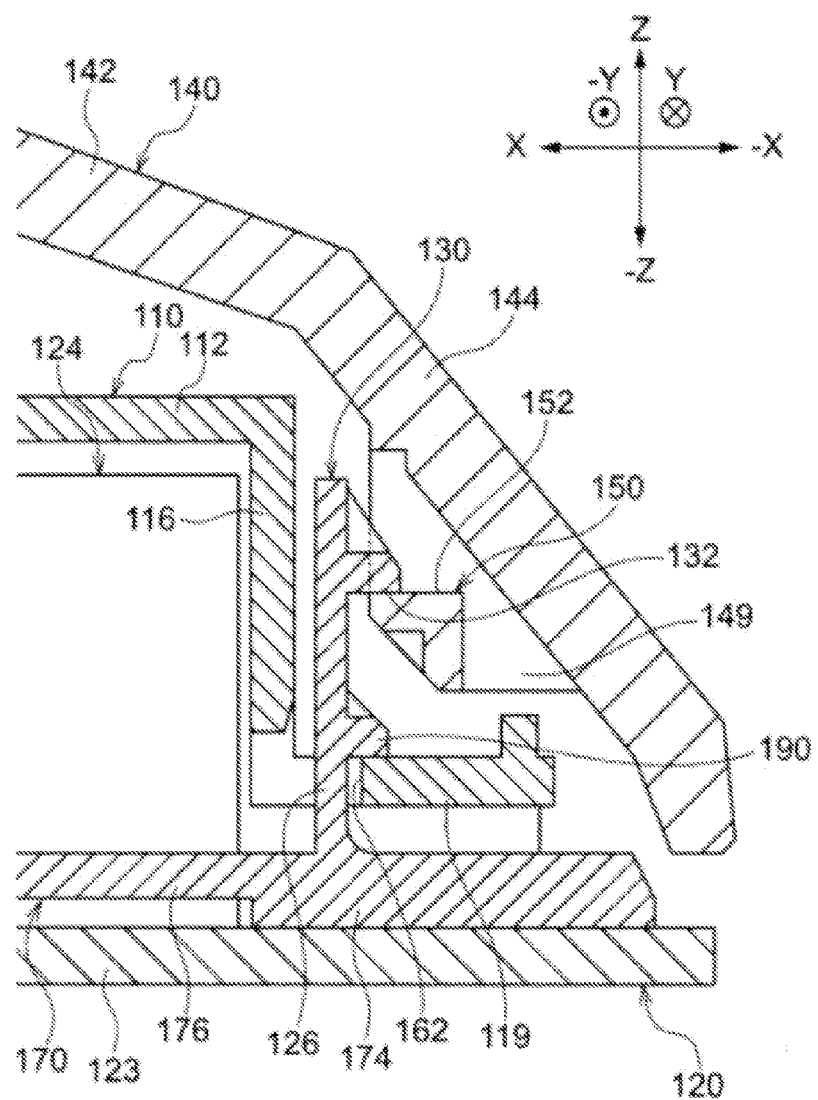
FIG. 13 is a sectional side view illustrating a state in which release of a cover is suppressed on the screen display device in FIG. 12.

According to the screen display device 100 of the second embodiment, as illustrated in FIG. 13, when the −X-direction end portion and X-direction end portion of the cover 140 are moved in the Z-direction, the opposite surface 132 contacts the contact surface 152, and movement of the cover 140 in the Z-direction beyond the contact point is suppressed. In addition, as illustrated in FIG. 13, when the −X-direction end portion of the cover 140 is moved in the Z-direction with the X-direction end side of the cover 140 as a supporting point, the opposite surface 132 also contacts the contact surface 152, and movement of the cover 140 in the Z-direction beyond the contact point is suppressed similarly.

As described above, by the opposite surface 132, release of the cover 140, in which the −X-direction end portion of the cover 140 is moved in the Z-direction, is suppressed.

Furthermore, when the cover 140 is moved in the −X-direction, the rib 148 contacts the contact surface 114A, and movement of the cover 140 in the −X-direction beyond the contact point is restricted. Therefore, displacement of the contact surface 152 from the opposite surface 132 in the −X-direction is suppressed.

Particularly, in the second embodiment, the amount of overlap K1 between the opposite surface 132 and contact surface 152 is configured to be larger than the gap S2 between the contact surface 114A of the side surface frame portion 114 and the rib 148. Therefore, even at a contact point where the rib 148 contacts the contact surface 114A, a state in which the contact surface 152 overlaps the opposite surface 132 is maintained.

Accordingly, even when the −X-direction end portion of the cover 140 is moved in the Z-direction from a contact point at which the rib 148 contacts the contact surface 114A, the opposite surface 132 contacts the contact surface 152, and movement of the cover 140 in the Z-direction (separation direction) beyond the contact point is suppressed.

As illustrated in FIG. 14, when the cover 140 is rotated with the −X-direction end side of the cover 140 as a supporting point so that the X-direction end portion of the cover 140 separates from the X-direction end portion of the device body 120, the opposite surface 132 of the claw portion 130 does not suppress the movement of the claw portion 150. With this configuration, the cover 140 is rotated.

Furthermore, in the rotation with the −X-direction end side of the cover 140 as a supporting point, the claw portion 150 is guided by the claw portion 130, and the cover 140 is released. With this configuration, the cover 140 is smoothly rotated in the rotation direction.

As described above, in the second embodiment, by the rotation with the −X-direction end side of the cover 140 as a supporting point, the cover 140 is released with respect to the device body 120 and separated from the device body 120.

In the second embodiment, the length of the gap S1 between the opposite surface 132 of the claw portion 130 and the contact surface 152 of the claw portion 150 is configured so that the opposite surface 132 does not reach a path of the movement of the contact surface 152 when the cover 140 is rotated with the −X-direction end side of the cover 140 as a supporting point. In other words, in the second embodiment, by adjusting a positional relationship between the claw portion 130 and claw portion 150, a movement direction in which movement of the claw portion 130 is suppressed and a movement direction in which movement of the claw portion 130 is not suppressed are defined. The movement direction in which movement of the claw portion 130 is suppressed is the direction in which the cover 140 is not released. The movement direction in which movement of the claw portion 130 is not suppressed is the direction in which the cover 140 is released.

As described above, because release directions of the cover 140 are defined depending on whether or not the movement of the claw portion 130 is suppressed by the claw portion 150, the release directions of the cover 140 with respect to the device body 120 may be defined without adding a component other than the claw portion 150 and claw portion 130. In other words, compared with a case in which a component other than the claw portion 150 and claw portion 130 is desirable, the release directions of the cover 140 with respect to the device body 120 may be defined using a simple structure.

In the second embodiment, because the wirings 113 and 115 are connected on the side where a supporting point, used when the cover 140 is rotated to be released, is located (−X-direction end side), it is difficult for the wirings 113 and 115 to be drawn when the cover 140 is released with respect to the device body 120 (refer to FIG. 10). Therefore, damage to the wirings 113 and 115 may be suppressed.

Furthermore, as described above, because the release directions of the cover 140 with respect to the device body 120 are defined by the claw portion 130 and claw portion 150, compared with a case in which a hinge or the like is used, the structure of the screen display device 100 itself becomes simple. Further, because the structure of the device body 120 of the screen display device 100 does not have to be strengthened, it is possible to make the screen display device 100 thinner and lighter.

The cover 140 separated from the device body 120 is attached to the device body 120 in the −Z-direction. At this time, the sloping surface 158 of the claw portion 150 contacts the sloping surface 138 of the claw portion 130, and the erect portion 126 is deformed elastically in the X-direction. With this configuration, attachment of the cover 140 to the device body 120 and assembly of the cover 40 become easy.

Moreover, in the second embodiment, because, in addition to the claw portion 130, the claw portion 190 to lock the first frame 110 is formed on the erect portion 126, the number of components may be reduced compared with a case in which the claw portion 190 is formed on other members.

Variations

In the first embodiment, the opposite surface 32 of the claw portion 30 contacts the contact surface 52 of the claw portion 50. Either of the opposite surface 32 or contact surface 52, however, may be an inner wall surface formed on an inner wall of a hole or a groove. The opposite surface 132 and contact surface 152 of the second embodiment may also be configured in a similar way.

Although, in the first embodiment, the rib 48 is formed on the cover 40, the rib 48 may be formed on the device body 20. Although, in the second embodiment, the rib 148 is also formed on the cover 140, the rib 148 may be formed on the device body 120.

In addition, a plurality of variations described above may be used by combining them appropriately.

Embodiments of the techniques disclosed herein are described above, but these embodiments are not limiting; it will be appreciated that numerous other modifications and embodiments are possible within the spirit and scope of this disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device, comprising:
a device body;
a cover that is attached to the device body so as to face the device body;
a contact portion that is formed with the device body side of the cover and is arranged at one end side in an orthogonal direction which is orthogonal to a direction in which the cover faces the device body; and
a suppression portion that is formed with one end side in the orthogonal direction of the device body, suppresses release of the cover by contacting the contact portion when the cover is moved in a separation direction in which the one end side of the cover becomes separated from the device body, and allows release of the cover when the cover is rotated with the one end side of the cover as a supporting point so that the other end side of the cover in the orthogonal direction becomes separated from the device body,
wherein the contact portion includes a contact surface that faces in the separation direction,
wherein the suppression portion includes an opposite surface that faces the contact surface with a gap therebetween and overlaps the contact surface when viewed from a point in the separation direction,
wherein the suppression portion includes a hook-shaped claw portion having the opposite surface and a sloping surface that is arranged on a separation direction side with respect to the opposite surface,
wherein the contact portion includes a hook-shaped claw portion having the contact surface and a sloping surface that is arranged on a side opposite to a separation direction side with respect to the contact surface, and
wherein when the cover is attached to the device body, the sloping surfaces contact each other and at least either of the suppression portion or the contact portion is deformed elastically.

2. The electronic device according to claim 1,
wherein, in the rotation with the one end side of the cover as a supporting point, the contact portion is guided by the suppression portion, and the cover is released.

3. The electronic device according to claim 1, further comprising:
a restriction portion that is formed with one of the device body and the cover, and, when the cover is moved in the orthogonal direction with respect to the device body, restricts the movement of the cover by contacting the other of the device body and the cover.

4. The electronic device according to claim 3,
wherein an amount of overlap between the contact surface and the opposite surface is larger than a gap between a contacted portion that the restriction portion contacts and the restriction portion.

5. An electronic device, comprising:
a device body;
a cover that is attached to the device body so as to face the device body;
a contact portion that is formed with the device body side of the cover and is arranged at one end side in an orthogonal direction which is orthogonal to a direction in which the cover faces the device body; and
a suppression portion that is formed with one end side in the orthogonal direction of the device body, suppresses release of the cover by contacting the contact portion when the cover is moved in a separation direction in which the one end side of the cover becomes separated from the device body, and allows release of the cover when the cover is rotated with the one end side of the cover as a supporting point so that the other end side of the cover in the orthogonal direction becomes separated from the device body, a frame that holds a component arranged on the device body, wherein, on the suppression portion, a locking portion that locks the frame is formed.

6. The electronic device according to claim 1, further comprising:

wiring that is connected from one end side of the orthogonal direction of the device body to the one end side of the cover.

7. The electronic device according to claim 5, wherein the contact portion includes a contact surface that faces in the separation direction, and wherein the suppression portion includes an opposite surface that faces the contact surface with a gap therebetween and overlaps the contact surface when viewed from a point in the separation direction.

8. The electronic device according to claim 7, wherein the suppression portion includes a hook-shaped claw portion having the opposite surface and a sloping surface that is arranged on a separation direction side with respect to the opposite surface, wherein the contact portion includes a hook-shaped claw portion having the contact surface and a sloping surface that is arranged on a side opposite to a separation direction side with respect to the contact surface, and wherein when the cover is attached to the device body, the sloping surfaces contact each other and at least either of the suppression portion or the contact portion is deformed elastically.

9. The electronic device according to claim 5, wherein, in the rotation with the one end side of the cover as a supporting point, the contact portion is guided by the suppression portion, and the cover is released.

10. The electronic device according to claim 5, further comprising:

a restriction portion that is formed with one of the device body and the cover, and, when the cover is moved in the orthogonal direction with respect to the device body, restricts the movement of the cover by contacting the other of the device body and the cover.

11. The electronic device according to claim 10, wherein an amount of overlap between the contact surface and the opposite surface is larger than a gap between a contacted portion that the restriction portion contacts and the restriction portion.

12. The electronic device according to claim 5, further comprising:

wiring that is connected from one end side of the orthogonal direction of the device body to the one end side of the cover.

* * * * *